June 23, 1964   E. E. GERINGER   3,137,898
APPARATUS FOR THE MANUFACTURE OF FIBER-REINFORCED PLASTIC TANKS
Filed Sept. 19, 1960   4 Sheets-Sheet 1

INVENTOR.
ERNEST E. GERINGER
BY *Ely, Pearne*
*& Gordon*
ATTORNEYS.

June 23, 1964  E. E. GERINGER  3,137,898
APPARATUS FOR THE MANUFACTURE OF FIBER-REINFORCED PLASTIC TANKS
Filed Sept. 19, 1960  4 Sheets-Sheet 2

INVENTOR.
ERNEST E. GERINGER
BY Ely, Pearne &
Gordon
ATTORNEYS.

June 23, 1964 E. E. GERINGER 3,137,898
APPARATUS FOR THE MANUFACTURE OF FIBER-REINFORCED PLASTIC TANKS
Filed Sept. 19, 1960 4 Sheets-Sheet 3

INVENTOR.
ERNEST E. GERINGER
BY Ely, Pearne
& Gordon
ATTORNEYS.

United States Patent Office 3,137,898
Patented June 23, 1964

3,137,898
APPARATUS FOR THE MANUFACTURE OF FIBER-REINFORCED PLASTIC TANKS
Ernest E. Geringer, Windsor, Ohio, assignor to Structural Fibers, Inc., Chardon, Ohio, a corporation of Ohio
Filed Sept. 19, 1960, Ser. No. 56,935
6 Claims. (Cl. 18—45)

This invention relates generally to the manufacture of molded articles, and, more particularly, pertains to hollow containers or tanks which are fabricated by laying up porous, fibrous mats approximately in the shape of the container or tank to be produced and impregnating them with a liquid which is subject to curing or setting by application of a setting agent, such as heat, a catalyst, or both, whereby a substantially homogeneous seamless structure is achieved.

This invention constitutes an improvement in the molding apparatus and method of mold assembly described in the copending applications of Donald W. Randolph, Serial No. 577,487, filed April 11, 1956, Patent No. 2,977,268, Re. 25,241, and Serial No. 704,028, filed December 20, 1957, Patent No. 3,010,602, and in the copending application of Charles W. Nerwick, Serial No. 745,093, filed June 27, 1958, Patent No. 2,977,269.

One of the commercial applications of the inventions described and claimed in the aforementioned copending applications is in the manufacture of domestic water-softener tanks and similar large, water-tight, and chemically resistant, hollow objects. In general, the preferred tank structures are elongated cylinders having outwardly convex end walls, at least one of the end walls having a central opening therein for communication with the interior of the tank.

In many embodiments of such tanks, at least one additional opening is provided at any desired location in the cylindrical side wall of the tank, the side wall being thickened about the periphery of the additional opening to provide reinforcement in this region and to provide an adequate length of opening for tapping to receive a connecting threaded conduit, and the thickened portion gradually decreasing in thickness radially outwardly from the opening therein so as to merge gradually with the surrounding side wall. The regions surrounding the openings in the end walls of the tanks also are thickened to provide reinforcement and an adequate length of opening for tapping purposes.

According to the methods described in the above-mentioned applications, the hollow tanks are successfully and economically pressure molded so that the finished articles have substantially uniform wall thicknesses with substantially evenly distributed matted fibers, and the entrapment of air and the formation of voids in the matted fibers are avoided. These methods contemplate, generally, the step of laying up fiber matting in the approximate form of the desired object and encasing this form within a rigid mold casing. An expandable bag or envelope or other fluid expandable membrane, which will define the shape of the finished article, is positioned within the laid-up form in the mold, and preformed fiber end wall caps are telescoped into each end of the laid-up form. The external mold is closed by clamping to the end of the mold casing rigid casing caps which shape the end walls of the tank formed therein. With the mold and fiber preforms thus assembled, the matting is placed under a suitably moderate pressure by expanding the bag to hold the fiber matting in place against the mold, and then the fiber matting is partially permeated with a thermosetting resin or the like. The bag is subsequently expanded by further inflation to progressively compress the fiber matting in such a manner as to distribute the resin throughout the matting and achieve the desired results of pressure molding, while at the same time avoiding migration of the fibers and destruction of the laid-up fiber mats.

The flexible bag or envelope used in carrying out these methods of pressure molding is provided with a rigid fluid conduit through which fluid is introduced into the bag when the mold is closed, and this conduit is inserted upwardly through a central opening in the upper fiber end wall cap and through a central opening in the upper mold casing cap. The mold apparatus disclosed in the above-identified applications also includes an annular rib which surrounds the central opening in the mold casing cap and which extends axially inwardly of the mold. This annular rib has a diameter slightly less than the diameter of the central opening in the upper fiber end cap so that when the fiber end cap is telescoped into the laid-up fiber matting and the end casing cap of the mold is secured in place, the fluid conduit of the bag can be pulled axially outwardly relative to the mold to position the bag for the subsequent expanding step and, at the same time, to seat the upper fiber end cap around the annular rib. It has been found, however, that the pressure of the bag on the fiber end cap as the conduit is pulled outwardly frequently fails to position the end cap evenly around the annular rib; that is, the end cap will be cocked to one side or the other on the rib so that the outer surface of the end cap is not nested firmly and symmetrically against the inner surface of the end wall casing cap. When this occurs, it is obvious that a portion of the sides of the opening in the fiber end wall cap will be spaced from the surface of the annular rib and other portions will be distorted.

If the fiber end wall cap is cocked as described above, the subsequent expansion of the fluid bag will compress the end cap non-uniformly, thus resulting in a cylindrical tank having an end wall which varies appreciably in thickness and in strength. This condition also seriously weakens the end wall of the formed article in the region around the opening since the fibers will not be sufficiently compacted in those areas where the sides of the opening were spaced from the rib of the casing cap.

Another disadvantage of this mold apparatus is that, when the fluid expandable bag is expanded, it is forced to flex around the inwardly extending annular rib of the mold casing cap. Thus, the annular rib prevents the fluid-filled bag from exerting the required compressive force on the upper fiber end cap in the region immediately surrounding the central opening therein. This non-uniformity of pressure exerted by the bag on the end cap has resulted in the fibers around the opening being relatively loosely compacted.

This invention is an improvement in mold apparatus for pressure molding fiber-reinforced articles, and has for its principal objective the provision of a mold apparatus which overcomes the disadvantages discussed above. In particular, the invention contemplates the elimination of the annular rib from the upper casing cap of the mold and the provision of an improved structure for assembling and positioning the upper fiber end cap within the mold casing cap. In general, this is accomplished by a removable core which is adapted to be fitted within the central opening in the fiber end cap before the latter element is telescoped within the laid-up fiber matting. This core includes an axially outwardly extending neck which fits within the central opening of the upper end casing cap of the mold so as to assure that the fiber end cap will always be snugly and symmetrically nested against the inner surface of the casing cap when the mold is assembled.

Another feature of the invention is the provision of a cup-shaped member which is adapted to be seated in an inverted position on the core below and nested in the fiber end cap. This cup-shaped member has an outer surface generally conforming to the contour of the inner surface of the finished tank and has a cross-sectional wall thickness which tapers radially outwardly to a relatively thin rim so that when the bag is expanded in the region of the central opening therein, it will press the cup-shaped member and, thus, exert a more uniform compressive force on the fiber end cap.

Other objects of the invention include the provision of an improved mold apparatus and a method of mold assembly whereby the mold can be assembled in a minimum amount of time while assuring that the sidewall fiber matting and fiber end cap preforms are more accurately positioned within the mold.

These and other objects of the invention will become apparent from the following description and the accompanying drawings.

Figure 1:
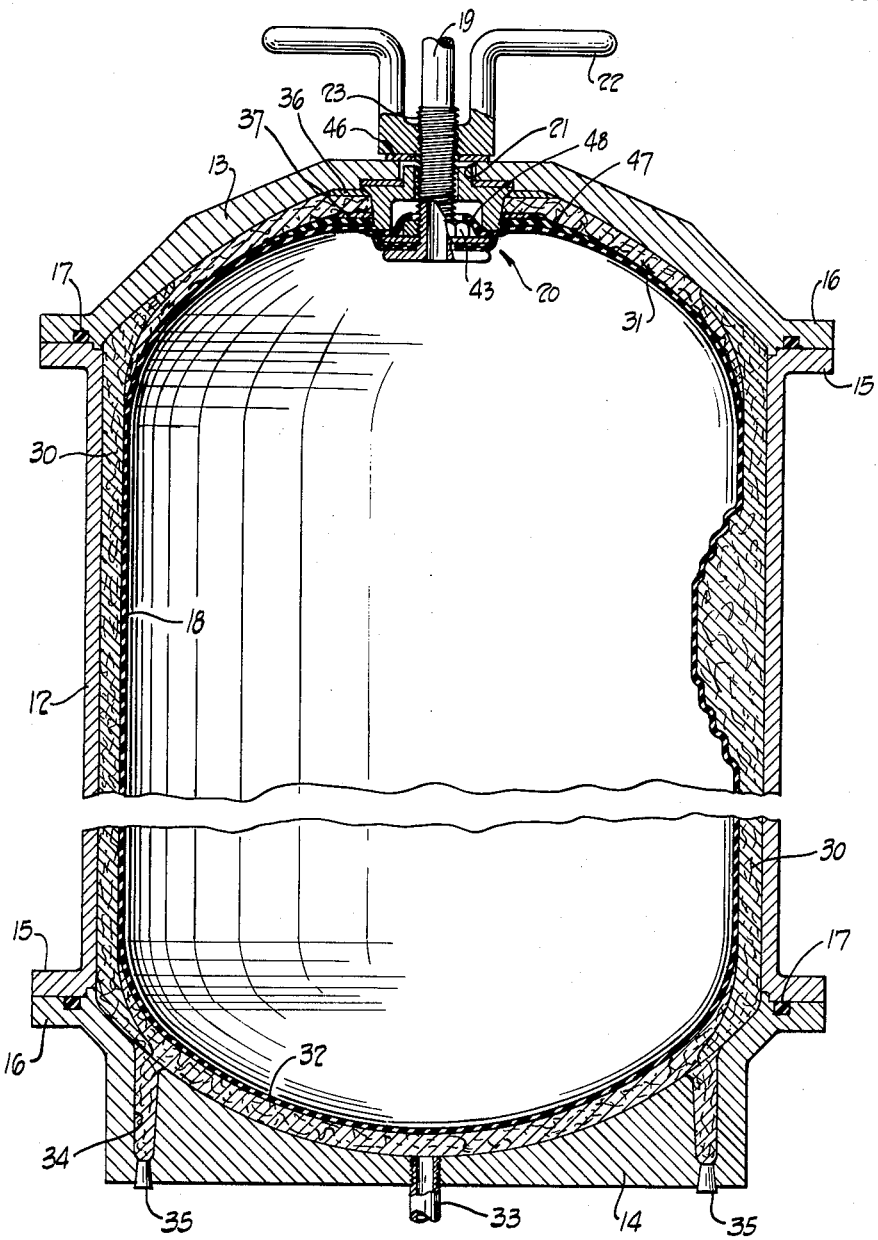
FIGURE 1 is a cross-sectional view showing the molding apparatus of the invention with all mold sections closed and with the fluid envelope expanded against the laid-up fiber matting in the mold.
Figure 4:
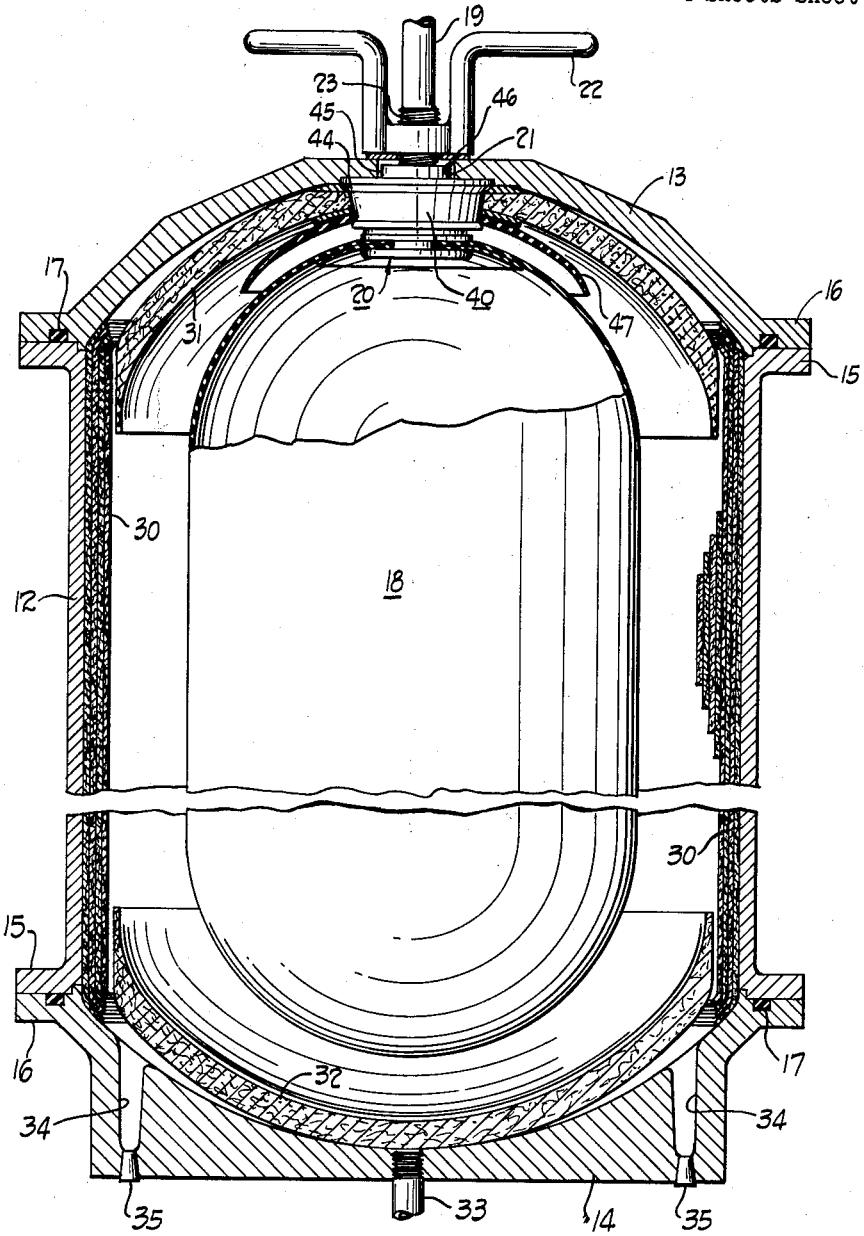
FIGURE 4 is a cross-sectional view similar to FIG. 1, but showing the mold apparatus before the fluid bag has been expanded and the molding operations commenced.

Referring generally to FIGS. 1 and 4, the principal elements of the mold assembly of the invention are shown as including a mold casing 12 and removable end casing caps 13 and 14. Suitable flanges 16 on these caps are provided with sealing rings 17 and adapted to close against end flanges 15 of the cylindrical mold casing 12. The internal surfaces of the casing caps are in the shape of oblate ellipsoids of revolution or they may be hemispherical or any other shape which is adapted to the production of a strong tank structure.

An inflatable, flexible bag or envelope comprising a rubber bag 18 is positioned within the mold and extends axially thereof. Preferably, the flexible envelope is encased in a protective sheath (not shown) of polyvinyl acetate film or cellophane film, or similar material which will protect the molding materials against chemical action of vulcanizing agents or residues thereof associated with the bag 18. The bag and protective sheath are connected to a threaded fluid conduit 19 by the clamping structure generally indicated by reference numeral 20 and hereinafter described in more detail. This fluid conduit 19 projects axially outwardly of the mold through a central opening 21 in the upper casing cap 13 and is held in position by a wing-nut 22 which cooperates with the threads 23 externally formed on the conduit.

When making a closed-end tank, reinforcing fibers, such as glass fibers or equivalent materials, are preformed, woven, or otherwise consolidated into a mat and shaped into a blank to conform to a portion of the mold cavity. For example a mat of felted glass fibers or the like may be convolutely wound into a cylindrical body blank 30 which is inserted in the cylindrical mold casing 12 as indicated in FIG. 4. Preformed fiber matting blanks or end caps 31 and 32 are then telescoped into the upper and lower ends, respectively, of the body blank 30 after the bag 18 and conduit 19 have been positioned in the body to form a hollow blank. These fiber matting blanks 31 and 32 are cup-shaped and are substantially identical in form except that the upper preformed end blank or cap 31 has a central opening 38 (see FIG. 3) through which projects the conduit 19 when this fiber end cap has been assembled with the end casing cap 13 as hereinafter described. When the fiber matting blanks have been located within the mold and the end casing caps 13 and 14 have been applied to the casing 12 to close the mold, the fluid conduit 19 is pulled axially outwardly of the mold and is locked in position by the wing-nut 22. Subsequently, the bag 18 is inflated just enough to bring it into contact over its entire outer surface with the inner surface of the laid-up form of fiber matting. Liquid resin, which may be any suitable thermosetting resin adapted to be set at temperatures above room temperature, is introduced through the supply line 33 in a measured amount. The amount of resin introduced is such that the charge will permeate the entire fiber lining during a subsequent compressing operation. Preferably, a slight excess of resin is provided so that the rising column of resin in the fiber matting will drive out all the air, the excess resin being allowed to drain from the mold through ducts (not shown) in the top casing cap 13 and through ducts which communicate with the foot or annular groove 34 in the bottom casing cap 14. When the air has been driven from the fiber matting and has escaped from the mold, the ducts are closed by plugs 35 and the bag 18 is further pressurized to evenly distribute the resin.

After the fiber body of the article has been thus impregnated and shaped within the mold and while the shape is maintained by pressure from the bag 18, the casing of the mold is subjected to heat in order to set the resin. When the resin has set, the conduit 19 of the bag 18 is opened to the atmosphere to permit the bag to collapse. The upper and lower casing caps are then removed from the mold casing 12 while pulling the collapsed bag 18 out through the hole in the upper end of the formed structure as the upper casing cap is removed. The finished molded article is then slid longitudinally from the casing 12.

Figure 3:
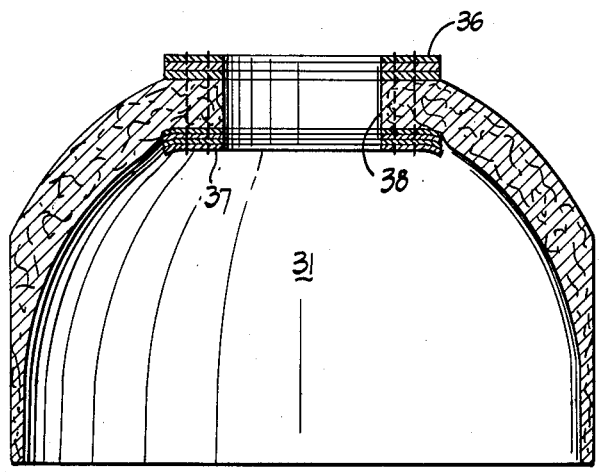
FIGURE 3 is a cross-sectional view of the upper fiber end cap preform which is to be formed into the end wall of the molded article.

An enlarged view of the upper fiber blank or end cap 31, which is molded to form an end wall of the finished article, is shown in FIG. 3. This fiber cap 31, which is substantially identical to the other fiber blank or end cap 32 except for the central opening 38, may be shaped by conventional procedures, one example being described in somewhat more detail in the aforementioned copending applications. The outer diameter of the caps 31 and 32 is substantially equal to the internal diameter of the cylindrical body blank 30 after it has been positioned within the casing 12 and compressed with the maximum pressure employed during the molding operation.

As shown in FIG. 3, the fiber cap 31 also preferably includes a plurality of washers 36 of fiber matting on the external surface of the cap surrounding the central opening 38. Similar washers 37 also surrounding the central opening 38 are preferably provided on the internal surface of this fiber cap. Both sets of washers may be secured to the preformed fiber blank or end cap 31 by stitching or in any other suitable manner. When the fiber end cap has been molded to form the end wall of the finished article by the procedure discussed above, the washers add an additional thickness to the end wall in the region of the opening so that this opening can be more readily tapped to receive a threaded pipe.

Figure 2:
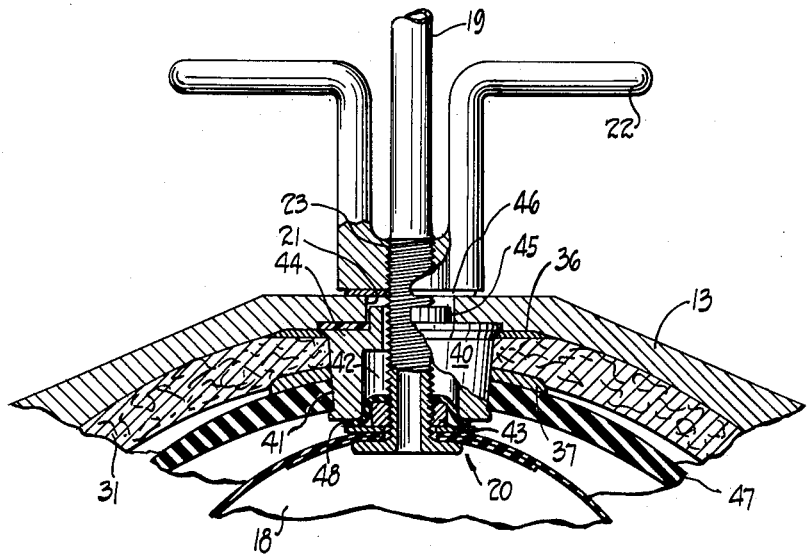
FIGURE 2 is a fragmentary, detailed, view of the upper casing cap of the mold, partly in section, the upper fiber end cap preform, and the associated positioning structure.

The structure for positioning the fiber blank or end cap 31 within the mold casing cap 13 is shown in detail in FIGS. 2 and 4. This structure includes a lightweight metal core 40 which is slidably received on the conduit 19 above the bag 18. As shown, the core 40 is in the form of a generally cylindrical body 41 having a radially outwardly flared flange 44 on its upper end and an axially extending upper neck portion 45. This neck portion 45 has an outer diameter such that it may be fitted within the central opening 21 of the casing cap 13, and has a bore which is slightly larger than the fluid conduit 19 of the bag 18. The bore of the neck portion 45 communicates at its lower end with a recess 42 in the bottom of the cylindrical body portion 41. This recess receives a jam nut 43 which is used to secure the bag 18 to the conduit 19. A rubber washer 48 may be provided between the bottom of the core 40 and the jam nut 43.

The cylindrical body 41 of the core 40 is adapted to be snugly fitted within the central opening 38 of the fiber blank or end cap 31 so that the top of the end cap will abut against the flange 44 of the core. A cup-shaped blank shaping member 47 having a central opening also is snugly fitted in an inverted position about the peripheral surface of the cylindrical body 41 of the core below the end cap 31. The outer surface of this cup-shaped blank shaping member 47 conforms generally to the inner surface of the end cap 31.

In the preferred embodiment of the invention, the cup-shaped blank shaping member 47 is molded rubber and, as shown in FIGS. 2 and 4, has a wall section which tapers in cross-sectional thickness from a relatively thick bottom to a relatively thin, radially flaring rim. When the member 47 is mounted in an inverted position on the core 40 with its relatively thick bottom portion contiguous to the upper fiber blank or end cap 31, the subsequent expansion of the bag 18 will press this bottom portion against the end cap to uniformly compact the fibers in the region of the opening 38. Thus, even though the core 40 prevents the bag 18 from flexing upwardly to any great extent, the interposition of member 47 permits the disclosed apparatus to pressure mold a tank having a uniformly strong end wall. This mold construction is to be contrasted to that of the above-identified Randolph and Nerwick applications in which the fluid expandable bag must alone be relied on to contact and compress the fiber end cap. Since the bag would be forced to stretch upwardly around the bottom of the core 40, it will be obvious that it could not press as forcibly against the end cap 31 in the region surrounding the opening 38, and, thus, that the fibers in this region would not be sufficiently packed together to assure that the molded article will be formed with a strong end wall.

The general procedure followed in assembling the mold apparatus comprising the invention is to fit the convolutely rolled body blank 30 within the mold casing 12 as explained above and then to telescope the matting blank 32 within the lower end of the body blank 30 and close the lower end of the mold casing by the casing cap 14. In a sub-assembly step, the core 40 is fitted within the opening 38 of the upper fiber blank or end cap 31 and the cup-shaped blank shaping member 47 is pressed onto the core below the end cap 31. The forcible press fit of the member 47 onto the core serves the desirable function of precompressing the fibers in the contiguous end cap 31. When this sub-assembly has been completed and when the bag 18 has been placed within the cylindrical body blank 30 in the casing, the end blank 31 is telescoped into the upper end of the body blank 30 as was the lower end blank 32 and the mold closed by the casing cap 13. After the mold has been closed, the conduit 19 and the bag 18 are pulled axially upwardly of the mold so that the neck 45 of the core 40 is seated within the opening 21 of the casing cap 13. The positioning of the neck 45 within the opening 21 assures the mold operator that the fiber end cap 31 has been snugly and symmetrically positioned against the inner surface of the casing cap 13 so as to be in proper position relative to the cylindrical body blank 30 and the casing cap during the subsequent molding operation. When the conduit 19 has been pulled axially outwardly to its proper position, the wing-nut 22 is threaded on this conduit and tightened against the washer 46 to complete the mold assembly operation. After the hollow tank has been pressure molded by the procedure previously discussed, the end caps 13 and 14 may be removed from the casing 12 and the tank slid longitudinally from either end of the casing. Either before or after the tank has been removed from the casing, the core 40, the bag 18 and the cup-shaped blank shaping member 47 can be readily disassembled from the tank by drawing them out of the opening which has been formed in the end wall of the tank.

While the preferred tank structure formed by the molding apparatus of the invention has been disclosed as having outwardly convex end walls, tanks of different configurations may likewise be advantageously molded by molding apparatus having the general construction heretofore discussed.

Figure 5:
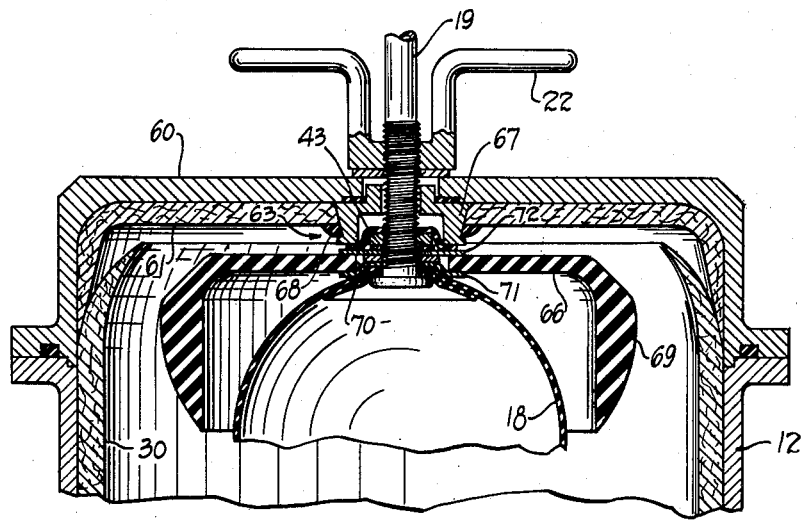
FIGURE 5 is a fragmentary, cross-sectional view of a modified form of the molding apparatus comprising the invention, showing the molding apparatus and laid-up fiber matting before the fluid bag has been expanded and the molding operations commenced.
Figure 6:
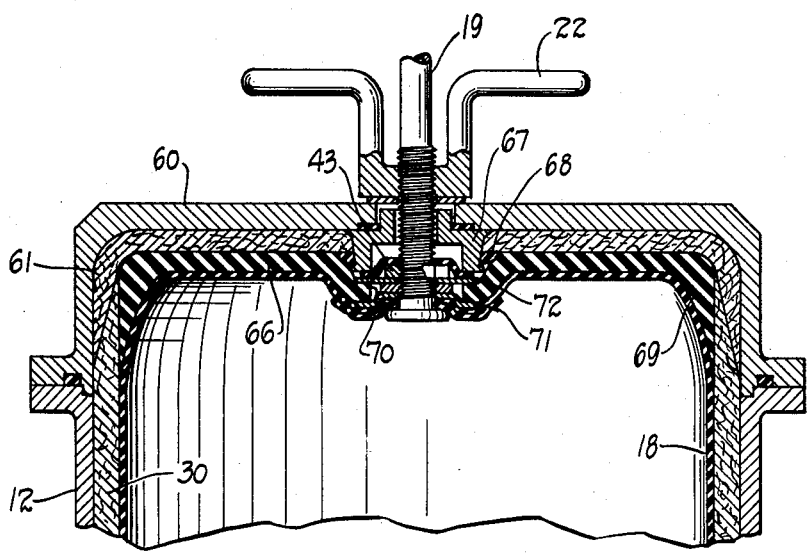
FIGURE 6 is a fragmentary, cross-sectional view similar to FIG. 5, but showing the fluid bag expanded against the laid-up fiber matting in the mold.

In this connection, reference is made to FIGS. 5 and 6 which show a modified form of the invention adapted to the molding of tanks having flat end walls with substantially a 90-degree shoulder between the end walls and the sides of the tanks. In this embodiment, the principal elements of the mold assembly again include a mold casing 12, a removable top casing cap 60 and a removable bottom casing cap (not shown). The casing caps differ in shape, however, from the embodiment shown in FIGS. 1–4 in that they are of a generally cylindrical cup-shaped configuration instead of having internal surfaces which are oblate ellipsoids of revolution. Likewise, the upper, preformed, fiber matting blank or cap 61 and the lower, preformed, fiber matting blank (not shown) are of generally cylindrical cup-shaped configuration.

The procedure followed in assembling the fiber matting blank within the mold is essentially that disclosed in the manufacture of tanks having outwardly convex end walls except that the upper fiber blank or end cap 61, as well as the lower fiber blank or end cap (not shown) are positioned with their vertical depending rim portions surrounding and embracing the outer surface of the cylindrical body blank 30 instead of being telescoped within the ends thereof. When the fiber matting blanks have been located within the mold in the manner described, the end casing caps are applied to the casing 12 to close the mold while drawing the fluid conduit 19 axially outwardly of the mold through the casing cap 60 and locking it in position by the wing-nut 22. The procedure followed in impregnating and shaping the fiber matting blanks to form the finished article has heretofore been disclosed in connection with the embodiment of FIGS. 1–4 and therefore it is not believed necessary to again set forth a detailed explanation of this portion of the molding operation.

Reference numeral 63 generally designates the structure for positioning the end cap 61 within the mold casing cap 60 and for assuring that the fibers in the cap 61 will be uniformly compacted and impregnated with resin during the molding operation. As shown in FIGS. 5 and 6, this structure 63 includes a rubber, blank-shaping member 66 mounted on the lower end of the conduit 19 above the bag 18, a lightweight metal core 67 which is similar in shape to the corresponding member 40 of FIGS. 1–4, and a flexible, washer-shaped rubber clip 68 on the cylindrical body portion of the core 67.

As in the case of the previously described cup-shaped blank shaping member 47, the member 66 is adapted to press against the fiber blank or end cap 61 as the bag 18 is expanded in a manner to uniformly compact the fibers of the end cap. To this end, the rubber blank shaping member 66 is formed of generally cup-shaped configuration, and includes a downwardly extending flange 69 whose medial portion is of relatively thick cross-section. This shape of the member 66 is such that, as the bag 18 is expanded, the relatively thick medial portion of the flange will be forced upwardly and outwardly to press the fiber cap 61 against the inner surface of the 90 degree shoulder of the mold casing cap 60, thereby assuring uniform compaction of the fibers into the sharp recess of this shoulder (FIG. 6).

It will be observed that, inasmuch as the member 66 is mounted on the conduit 19 below the core 67, the member is forced to stretch upwardly around the bottom of the core, and thus cannot press as forcibly against the end cap 61 in the region immediately adjacent the core as would be desired. The rubber, flexible, washer-shaped clip 68 is therefore mounted on the core 67 immediately below the fiber blank end cap 61. When the clip 68 is mounted in the foregoing manner, the expansion of the bag 18 and the upward stretching of the member 66 will press the clip against the end cap to uniformly compact the fibers in the region adjacent and surrounding the opening in the cap.

In assembling the structure 63, the conduit is inserted through the central opening 70 in the cylindrical cup-shaped blank shaping member 66 to position the top of the bag 18 adjacent the inner surface of the member. The member 66 is held in a fixed position on the conduit by a pair of spaced clamping washers 71 and 72 and by a jam nut 43. In another assembly step, the core 67 is fitted within the central opening of the end cap 61 and the clip 68 pressed onto the core below the end cap. When these assembly steps have been completed, the bag 18 and member 66 are positioned within the cylindrical body 30 in the casing 12, and the fiber blank or end caps are fitted around the ends of the body blank 30 as discussed above, and the mold casing is closed by the upper and lower casing caps. After the mold has been closed, the conduit 19 is pulled axially outwardly of the mold to seat the neck of the core 67 within the opening in the upper casing cap 60. As in the case of the previously disclosed embodiment, the seating of the neck of the core within the opening assures the mold operator that the fiber end cap 61 has been snugly and symmetrically positioned against the inner surface of the casing cap 60 so as to be in proper position relative the cylindrical body blank 30 and the casing cap during the subsequent molding operation.

It will thus be seen that in both embodiments of the invention there has been provided an improved mold apparatus which may be assembled in less time and with greater accuracy than the apparatus heretofore known. Moreover, the cup-shaped blank shaping members 47 and 66 have been included in the mold assemblies to assure that a more uniform compressive force will be applied to the article during the molding operation.

Obviously, many modifications and variations of the invention will be apparent to those skilled in the art in the light of the above teaching. It will thus be understood that the disclosure is intended to include all modifications and variations within the spirit and scope of the invention as defined by the appended claims.

What is claimed is:

1. In combination with an apparatus for forming hollow molded articles by fluid pressure in which a blank of fibrous matting material is positioned in a closed mold and an inflatable bag is expanded within the blank to force the blank into firm contact with the inner surface of the mold, said mold and said blank having means defining openings therein, the improvement which comprises a blank positioning means comprising a core, said core being mounted within the opening in said blank, an axially extending neck portion on one end of said core adapted to be inserted into the opening in the mold, and means extending from the outside of said mold through said neck portion and core, said means abutting the end of said core opposite from said neck portion and within the mold and blank whereby said neck portion can be seated in the opening in the mold when the mold is closed by pulling said means outwardly relative to the mold to thereby position said blank relative to the mold so that said openings are axially aligned.

2. Apparatus for forming molded articles in a closed mold by fluid pressure comprising a mold casing, a mold casing cap on one end of said mold casing, said mold casing and said mold casing cap defining a hollow molding chamber, said mold casing cap having an opening therein, a fluid-expandable membrane in said mold casing, a fluid conduit attached to said membrane, said conduit extending axially outwardly of said casing through said opening in said casing cap, and a blank-positioning core slidably mounted on said conduit within said casing, said core comprising a body portion and an axnally extending neck, said conduit having means abutting the end of said body portion, said neck being adapted to be fitted in said opening in said casing cap and said body portion being adapted to extend into said hollow molding chamber when said conduit is pulled axially outwardly relative to said casing.

3. In an apparatus for forming hollow molded articles by fluid pressure in which a hollow blank of fibrous matting material is positioned within a mold and an inflatable bag is expanded within the blank to force the blank into firm contact with the inner surface of the mold, an improved inflatable bag assembly comprising a flexible envelope, a fluid conduit fastened to said envelope and communicating with the interior thereof, blank-positioning means slidably mounted on said conduit, said blank-positioning means having a peripheral surface adapted to be snugly engaged within an opening in the blank, and blank-shaping means mounted on said blank-positioning means between said envelope and a blank mounted on said blank positioning means, said blank-shaping means being formed to engage the inner surface of said blank and to fit within said blank whereby expansion of said envelope will force said blank-shaping means into forming contact with a portion of the inner wall surface of said blank.

4. A mold apparatus for forming hollow articles by fluid pressure in which a hollow blank of fibrous matting material is positioned within a mold and an inflatable bag is expanded within the mold to force the blank into firm contact with the inner surface of the mold comprising a mold casing closed at one end, a removable casing cap fastened to the other end of said casing, said mold casing and casing cap being shaped to receive a blank of fibrous matting material, an inflatable bag positioned in and extending axially of said mold, a conduit connected to one end of said bag, said mold casing cap and said blank each having an opening therein, said conduit extending axially outwardly of said mold through the opening in said mold; a blank-positioning core slidably mounted on said conduit within said mold, said blank-positioning core comprising a cylindrical body portion adapted to be fitted within the opening in the blank and an axially extending neck of reduced diameter on one end of said core, said neck being fitted in said opening of said casing cap; and blank-shaping means on said cylindrical body portion of said core, said blank-shaping means comprising a cup-shaped member mounted on said core in an inverted position below a blank fitted on said cylindrical portion of said core, said cup-shaped member having a relatively thick bottom portion positioned contiguous to said blank whereby inflation of said bag will press said bottom portion against said blank.

5. Apparatus for forming a hollow, substantially closed fiber-reinforced, molded article having cylindrical side walls, end walls, and an opening in one of said end walls, comprising a mold including a mold casing of such size that it may be lined with a plurality of overlapped sections of preformed, porous, fiber matting over its entire inner wall surface, a bottom casing cap and a top casing cap removably fastened to opposite ends of said mold casing, each of said casing caps being shaped to receive a preformed blank of fiber matting, said top casing cap having a central opening; and an inflatable bag assembly comprising a flexible envelope positioned within said mold, said envelope being shaped so that it extends substantially the full length of said mold casing, a conduit connected to said envelope and extending outwardly of said mold through said opening in said top casing cap, a blank-positioning core slidably mounted on said conduit and located within said mold, said core having a neck portion fitted into said opening of said top casing cap and a cylindrical body having a peripheral surface of a shape so that it may be snugly fitted into an opening in one of said performed matting blanks whereby said blank can be snugly and symmetrically positioned adjacent the inner surface of said top casing cap when said neck portion is fitted in said opening, and a cup-shaped member having an outer surface substantially conforming in shape to the inner surface of said top casing cap and having a wall thickness which tapers in cross-section from a relatively thick bottom to a relatively thin rim, said cup-shaped member being mounted in an inverted position below said one preformed matting blank, whereby expansion of said envelope will press said cup-shaped member into forming contact with said one fiber matting blank and will press said overlapped sections of matting and said preformed matting blanks into firm contact with the inner wall surface of said mold.

6. A mold apparatus for forming hollow articles by fluid pressure in which a hollow blank of fibrous matting material is positioned within a mold and an inflatable bag is expanded within the mold to force the blank into firm contact with the inner surface of the mold comprising a mold casing closed at one end, a removable casing cap fastened to the other end of said casing, said mold casing and casing cap being shaped to receive a blank of fibrous matting material, an inflatable bag positioned in and extending axially of said mold, a conduit connected to one end of said bag, said mold casing cap and said blank each having openings therein, said conduit extending axially outwardly of said mold through the opening in said mold; a blank-positioning core slidably mounted on said conduit within said mold, said blank-positioning core comprising a cylindrical body portion adapted to be fitted within the opening in the blank and an axially extending neck of reduced diameter on one end of said core, said neck being fitted in said opening of said casing cap; a washer-shaped, flexible clip mounted on said cylindrical body portion of said core below the blank, said clip being adapted to be pressed against the blank in the region adjacent and surrounding said opening in the blank; and a cup-shaped member mounted on said conduit in an inverted position between said bag and said blank-positioning core, said cup-shaped member including a flange having a relatively thick medial portion whereby inflation of said bag will press said medial portion against said blank and said flexible clip.

References Cited in the file of this patent
UNITED STATES PATENTS

| | | |
|---|---|---|
| 1,605,782 | Rota | Nov. 2, 1926 |
| 1,715,920 | Henry | June 4, 1929 |
| 2,086,276 | Lindas | July 6, 1937 |
| 2,206,410 | Lally | July 2, 1940 |
| 2,460,820 | Hagopian | Feb. 8, 1949 |
| 2,477,180 | Hemming | July 26, 1949 |
| 2,644,198 | Crawford | July 7, 1953 |
| 2,675,598 | Miller | Apr. 20, 1954 |
| 2,696,184 | Demerest | Dec. 7, 1954 |
| 2,865,079 | Marchioli et al. | Dec. 23, 1958 |
| 2,977,268 | Randolph | Mar. 28, 1961 |
| 2,977,269 | Nerwick | Mar. 28, 1961 |